United States Patent
Ma et al.

(10) Patent No.: US 11,881,340 B2
(45) Date of Patent: Jan. 23, 2024

(54) INDUCTOR STRUCTURE

(71) Applicant: Murata Manufacturing Co., Ltd., Nagaokakyo (JP)

(72) Inventors: Hongzhong Ma, Dongguan (CN); Zhuoliang Huang, Dongguan (CN); Qiongzhen Yan, Dongguan (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 370 days.

(21) Appl. No.: 17/137,509

(22) Filed: Dec. 30, 2020

(65) Prior Publication Data
US 2021/0225573 A1 Jul. 22, 2021

(30) Foreign Application Priority Data
Jan. 22, 2020 (CN) .................. 202010075304.X
May 28, 2020 (CN) .................. 202010466919.5

(51) Int. Cl.
*H01F 3/14* (2006.01)
*H01F 17/04* (2006.01)
(Continued)

(52) U.S. Cl.
CPC ............. *H01F 17/045* (2013.01); *H01F 3/14* (2013.01); *H01F 27/29* (2013.01); *H01F 27/324* (2013.01)

(58) Field of Classification Search
CPC .......... H01F 17/045; H01F 3/14; H01F 27/29; H01F 27/324; H01F 27/38; H01F 37/00;
(Continued)

(56) References Cited

U.S. PATENT DOCUMENTS 2,909,742 A * 10/1959 Lamberton ............. H01F 27/25
336/212
2011/0063065 A1* 3/2011 Hugues Douglas .... H01F 27/40
336/170
(Continued)

FOREIGN PATENT DOCUMENTS

EP 2 299 456 A1 3/2011

OTHER PUBLICATIONS

Official Communication issued in corresponding European Patent Application No. 21150483.2, dated Jun. 22, 2021.

*Primary Examiner* — Mang Tin Bik Lian
(74) *Attorney, Agent, or Firm* — Keating & Bennett, LLP

(57) ABSTRACT

Inductor structure is provided, including: n inductors, each inductor including a base plate, a cover plate, a first magnetic column and a coil wound around the first magnetic column, n≥2; m second magnetic column(s), each second magnetic column is disposed between at least two inductors, and has a first terminal connected to the cover plates of the at least two inductors, and a second terminal connected to the base plates of the at least two inductors, m<n, wherein the inductor and the second magnetic column connected with and disposed on one side of the inductor constitute an inductor unit, and the n inductors and the m second magnetic column(s) constitute multiple inductor units, wherein each inductor unit includes at least one air gap. Multiple inductors arranged close to each other are integrated in a small space, and not affected by mutual magnetic influence, which helps to realize miniaturization.

8 Claims, 10 Drawing Sheets

(51) Int. Cl.
*H01F 27/29* (2006.01)
*H01F 27/32* (2006.01)

(58) Field of Classification Search
CPC . H01F 3/10; H01F 27/24; H01F 27/26; H01F 27/263
See application file for complete search history.

(56) References Cited

U.S. PATENT DOCUMENTS

| | | | |
|---|---|---|---|
| 2011/0080244 A1 | 4/2011 | Chen et al. | |
| 2013/0033351 A1* | 2/2013 | Kim | H01F 27/38 336/170 |
| 2013/0201728 A1* | 8/2013 | Njiende | H02M 3/335 363/21.04 |
| 2014/0043127 A1* | 2/2014 | Worek | H02M 3/28 336/178 |
| 2014/0085035 A1* | 3/2014 | Kim | H01F 27/24 336/212 |
| 2014/0154920 A1* | 6/2014 | Dinh | H01F 27/2823 29/605 |
| 2014/0286068 A1* | 9/2014 | Allaert | H01F 30/06 336/212 |
| 2016/0049238 A1* | 2/2016 | Young | H01F 27/325 336/208 |
| 2019/0043653 A1* | 2/2019 | Dai | H01F 41/041 |

\* cited by examiner

INDUCTOR STRUCTURE

CROSS REFERENCE TO RELATED APPLICATIONS

This application claims the benefit of priority to Chinese Patent Application No. 202010075304.X filed on Jan. 22, 2020 and Chinese Patent Application No. 202010466919.5 filed on May 28, 2020. The entire contents of these applications are hereby incorporated herein by reference.

BACKGROUND OF THE INVENTION

1. Field of the Invention

The present disclosure generally relates to inductor technology field, and more particularly, to an inductor structure.

2. Description of the Related Art

A CLLLC resonant circuit includes two resonant inductors (hereinafter referred to as inductors). To ensure normal operation of the circuit, the two inductors should be arranged in appropriate positions in the circuit to avoid mutual influence of magnetism of the two inductors.

In existing techniques, a certain distance is kept between the two inductors to prevent the magnetism of the two inductors from affecting each other. However, this increases a size of a transformer, which is not conducive to miniaturization of the transformer.

SUMMARY OF THE INVENTION

Preferred embodiments of the present invention provide an inductor structure and a transformer, which may effectively reduce a size of a device and eliminate mutual influence of magnetism of multiple inductors.

In a preferred embodiment of the present disclosure, an inductor structure is provided, including: n inductors, wherein each of the n inductors includes a base plate, a cover plate, a first magnetic column disposed between the base plate and the cover plate, and a coil wound around the first magnetic column, where n≥2; and m second magnetic column(s), wherein for each of the second magnetic column (s), the second magnetic column is disposed between at least two of the n inductors, the second magnetic column has a first terminal and a second terminal along its extension direction, the first terminal is connected to the cover plates of the at least two inductors, and the second terminal is connected to the base plates of the at least two inductors, where m<n, wherein the inductor and the second magnetic column connected with and disposed on one side of the inductor constitute an inductor unit, and the n inductors and the m second magnetic column(s) constitute a plurality of inductor units, wherein each of the inductor units includes at least one air gap.

Optionally, the inductor structure further includes a non-magnetic electrical insulating layer used to form the air gaps.

Optionally, the number and/or positions of the air gaps included in each of the plurality of inductor units are the same.

Optionally, the at least one air gap is disposed between the base plate and the first magnetic column of the inductor in the inductor unit, or between the cover plate and the first magnetic column of the inductor in the inductor unit, or between the base plate of the inductor in the inductor unit and the second magnetic column, or between the cover plate of the inductor in the inductor unit and the second magnetic column.

Optionally, for each of the second magnetic column(s), there is at least one air gap between the first terminal of the second magnetic column and at least one cover plate of the at least two inductors, and there is at least one air gap between the second terminal of the second magnetic column and at least one base plate of the at least two inductors, wherein at least one of the at least one cover plate belongs to an inductor different from an inductor to which the at least one base plate belongs.

Optionally, the n inductors and the m second magnetic column(s) are arranged at intervals along the first direction, and for any second magnetic column, the inductor disposed on one side of the second magnetic column in the first direction is denoted as a first inductor, and the inductor disposed on the other side of the second magnetic column in the first direction is denoted as a second inductor; for any second magnetic column and the first and second inductors on both sides thereof, air gaps exist at least between the second magnetic column and the base plate of the first inductor and at least between the second magnetic column and the cover plate of the second inductor; or, air gaps exist at least between the second magnetic column and the cover plate of the first inductor and at least between the second magnetic column and the base plate of the second inductor.

Optionally, the inductor disposed on one side of the second inductor away from the first inductor along the first direction is denoted as a third inductor; for the second magnetic column between the second inductor and the third inductor, air gaps exist at least between the second magnetic column and the base plate of the second inductor and at least between the second magnetic column and the cover plate of the third inductor; or, air gaps exist at least between the second magnetic column and the cover plate of the second inductor and at least between the second magnetic column and the base plate of the third inductor.

Optionally, the n inductors include a first inductor, a second inductor and a third inductor which are arranged in a ring, and the number of the m second magnetic column(s) is one, and the second magnetic column is surrounded by the first inductor, the second inductor and the third inductor in a ring shape, the first terminal of the second magnetic column is connected to a cover plate of the first inductor, a cover plate of the second inductor, and a cover plate of the third inductor, and the second terminal of the second magnetic column is connected to a base plate of the first inductor, a base plate of the second inductor, and a base plate of the third inductor; air gaps exist between the first terminal of the second magnetic column and the cover plate of the first inductor, between the first terminal of the second magnetic column and the cover plate of the second inductor, between the first terminal of the second magnetic column and the cover plate of the third inductor, between the second terminal of the second magnetic column and the base plate of the first inductor, between the second terminal of the second magnetic column and the base plate of the second inductor, and between the second terminal of the second magnetic column and the base plate of the third inductor.

Optionally, the second magnetic column includes a single magnetic column, or includes a plurality of spliced magnetic columns.

Optionally, for each second magnetic column, the first terminal thereof is aligned with a first surface of cover plates of the at least two inductors, and the second terminal thereof is aligned with a first surface of base plates of the at least two inductors, wherein the first surface of the base plates is a side of the base plates away from the cover plates, and the first surface of the cover plates is a side of the cover plates away from the base plates.

Preferred embodiments of the present disclosure may have following advantages.

Preferred embodiments of the present disclosure provide an inductor structure which includes: n inductors, each of the n inductors includes a base plate, a cover plate, a first magnetic column disposed between the base plate and the cover plate, and a coil wound around the first magnetic column, where n≥2; m second magnetic column(s), for each of the second magnetic column(s), the second magnetic column is disposed between at least two of the n inductors, the second magnetic column has a first terminal and a second terminal along its extension direction, the first terminal is connected to the cover plates of the at least two inductors, and the second terminal is connected to the base plates of the at least two inductors, where m<n, wherein the inductor and the second magnetic column connected with and disposed on one side of the inductor constitute an inductor unit, and the n inductors and the m second magnetic column(s) constitute a plurality of inductor units, wherein each of the inductor units includes at least one air gap.

By the preferred embodiments, multiple inductors can be integrated in a small space, and the multiple inductors arranged close to each other may not be affected by mutual influence of magnetism, which is conductive to reducing a size of a device to realize miniaturization. Specifically, the inductor structure is formed by sandwiching a common second magnetic column between the inductors, so that multiple inductors can share the same second magnetic column, which is conducive to reducing the number of components to realize miniaturization. Further, with the arrangement of the air gaps provided in the preferred embodiments, when a magnetic flux loop of each inductor passes through the adjacent second magnetic column, the number of air gaps the magnetic flux loop passes through is the least, so that the magnetic flux loops formed by the coils wound around the first magnetic columns are substantially isolated from each other.

Further, each of the inductor units includes at least one air gap. Due to the increase of magnetic resistance at the air gap, it is possible to limit the magnetic flux in each inductor unit by increasing the magnetic resistance. Due to the air gap, the magnetic flux in each inductor unit generally passes through the second magnetic column shared with the adjacent inductor unit, rather than other paths (such as a serial flow to the adjacent inductor unit), which may effectively avoid mutual influence of magnetism of the multiple inductors. Therefore, by the preferred embodiments, multiple inductors may be arranged in a small space without mutual influence.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
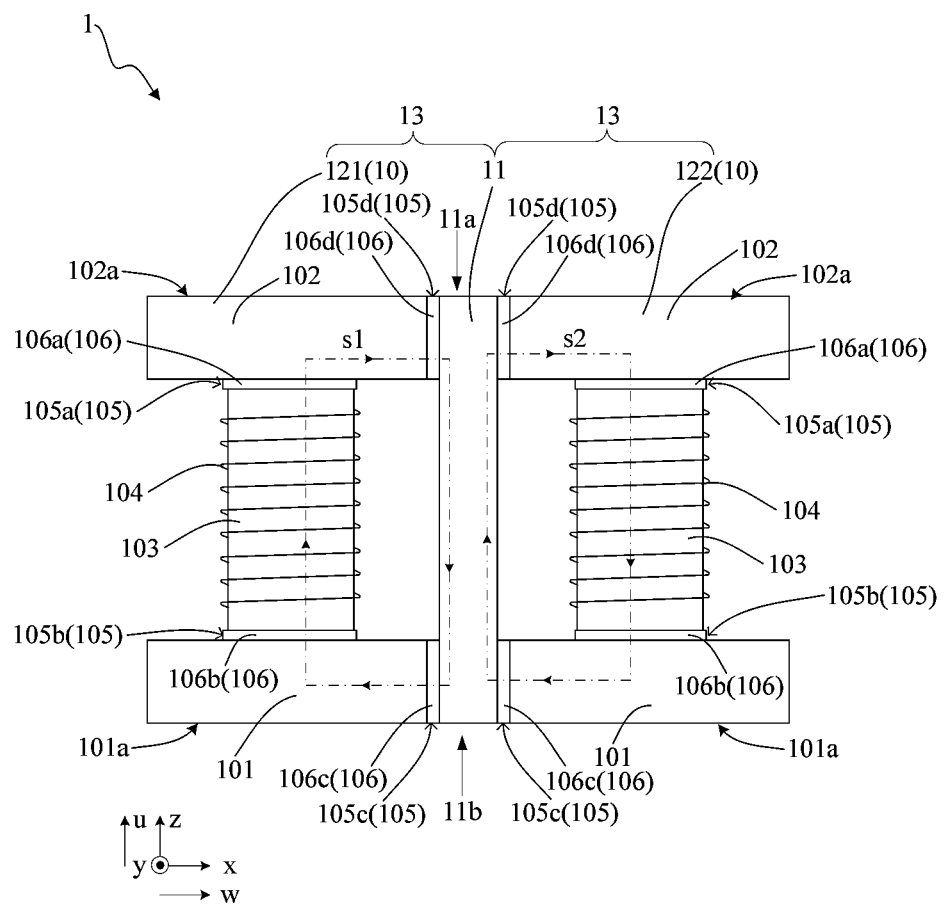
FIG. 1 schematically illustrates a diagram of an inductor structure according to a preferred embodiment of the present invention.

Hereinafter, preferred embodiments of the present disclosure are described in detail with reference to figures. Same parts are marked with same reference numerals in figures. The preferred embodiments below are merely examples, and it is a matter of course that structures shown in different preferred embodiments may be partially replaced or combined. Common features among different preferred embodiments are omitted, and merely differences are described. In particular, same effects produced by same structures are not mentioned one by one in each preferred embodiment.

In order to clarify the object, solutions and advantages of preferred embodiments of the present disclosure, preferred embodiments of present disclosure will be described clearly in detail in conjunction with accompanying figures.

Figure 2:
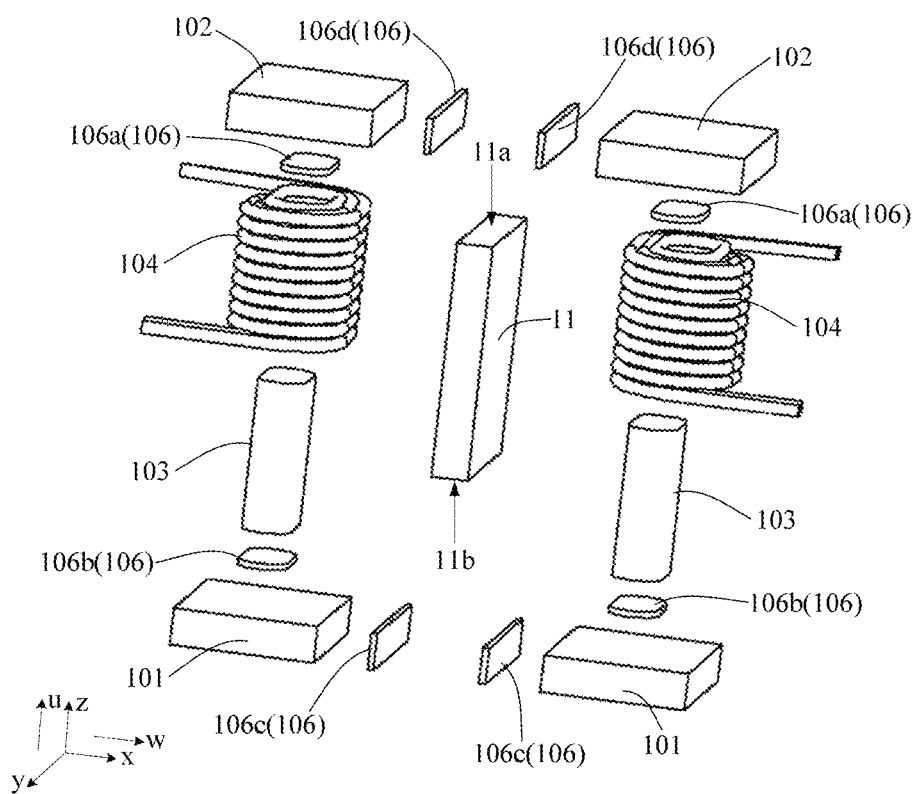
FIG. 2 schematically illustrates an explosive view of the inductor structure as shown in FIG. 1.

FIG. 1 schematically illustrates a diagram of an inductor structure 1 according to a preferred embodiment, and FIG. 2 schematically illustrates an explosive view of the inductor structure 1 as shown in FIG. 1.

Referring to FIGS. 1 and 2, the inductor structure 1 includes n inductors 10, where n≥2. Each inductor 10 includes a base plate 101, a cover plate 102, a first magnetic column 103 disposed between the base plate 101 and the cover plate 102, and a coil 104 wound around the first magnetic column 103.

It should be noted that the coils 104 in FIG. 1 are merely illustrated as an example. In practice, those skilled in the art may adjust the number of turns and winding density of the coils 104 as required.

Further, the winding direction of the coil 104 wound around each of the inductors 10 may be the same or different.

Further, the number of turns and the winding density of the coil 104 wound around each of the inductors 10 may be the same or different.

Further, for each inductor 10, the base plate 101 and the cover plate 102 may be parallel to each other.

Further, the inductor structure 1 further include non-magnetic electrical insulating layers 106 disposed between the first magnetic column 103 and the corresponding cover plate 102 and between the first magnetic column 103 and the corresponding base plate 101, so as to separate the first magnetic column 103 and the corresponding cover plate 102 or the corresponding base plate 101 to form the air gaps 105.

Further, the non-magnetic electrical insulating layers 106 may adjust width of the air gaps 105. For example, the thicker the non-magnetic electrical insulating layers 106, the wider the air gaps 105.

In some preferred embodiments, the non-magnetic electrical insulating layers 106 may include non-magnetic electrical insulating films or glue mixed with non-magnetic electrical insulating particles.

The inductor 10 has a length direction (x direction as shown), a width direction (y direction as shown), and a height direction (z direction as shown) that are perpendicular to each other. A direction in which the base plate 101 of the inductor 10 points to the cover plate 102 defines the height direction (z direction as shown), on a plane perpendicular to the z direction, two adjacent sides of the base plate 101 respectively define the length direction (x direction as shown) and the width direction (y direction as shown).

In some preferred embodiments, on the plane formed by the x direction and the y direction, cross sections of the base plate 101 and the cover plate 102 may be rectangular structures with a same area, such as squares or rectangles. In practice, those skilled in the art may adjust shapes of the base plate 101 and the cover plate 102 as required to obtain a magnetic induction effect that meets specific requirements.

The preferred embodiment as shown in FIGS. 1 and 2 takes n=2 as an example for exemplary illustration. Specifically, the n inductors 10 may include a first inductor 121 and a second inductor 122 that are arranged side by side along a first direction (the w direction as shown). In FIGS. 1 and 2, the w direction is parallel to the x direction, which is illustrated as an example. The cover plate 102 of the first inductor 121 and the cover plate 102 of the second inductor 122 may be on a same plane, and the base plate 101 of the first inductor 121 and the base plate 101 of the second inductor 122 may be on a same plane.

For the sake of distinction, the air gap between the first magnetic column 103 and the cover plate 102 of each inductor 10 is marked as the air gap 105a, for example, the air gap 105a between the first magnetic column 103 and the cover plate 102 of the first inductor 121, and the air gap 105a between the first magnetic column 103 and the cover plate 102 of the second inductor 122, and the corresponding non-magnetic electrical insulating layer is marked as the non-magnetic electrical insulating layer 106a. The air gap between the first magnetic column 103 and the base plate 101 of each inductor 10 is marked as the air gap 105b, for example, the air gap 105b between the first magnetic column 103 and the base plate 101 of the first inductor 121, and the air gap 105b between the first magnetic column 103 and the base plate 101 of the second inductor 122, and the corresponding non-magnetic electrical insulating layer is marked as the non-magnetic electrical insulating layer 106b.

Further, the inductor structure 1 further includes m second magnetic column(s) 11, for each of the second magnetic column(s) 11, the second magnetic column 11 is disposed between at least two of the n inductors 10, the second magnetic column 11 has a first terminal 11a and a second terminal 11b along its extension direction (the u direction as shown), the first terminal 11a is connected to the cover plates 102 of the at least two inductors 10, and the second terminal 11b is connected to the base plates 101 of the at least two inductors 10, where m<n.

Further, the inductor 10 and the second magnetic column 11 connected with and disposed on one side of the inductor 10 constitute an inductor unit 13, and thus the n inductors and the m second magnetic column(s) 11 constitute a plurality of inductor units 13. In the preferred embodiment as shown in FIGS. 1 and 2, the inductor structure 1 includes one second magnetic column 11, and accordingly the inductor structure 1 includes two inductor units 13 that share the one second magnetic column 11.

Further, each of the inductor units 13 includes at least one air gap 105.

Further, the at least one air gap 105 may be disposed between the base plate 101 and the first magnetic column 103 of the inductor 10 in the inductor unit 103, or between the cover plate 102 and the first magnetic column 103 of the inductor 10 in the inductor unit 13, or between the base plate 101 of the inductor 10 in the inductor unit 13 and the second magnetic column 11, or between the cover plate 102 of the inductor 10 in the inductor unit 13 and the second magnetic column 11.

In the preferred embodiment as shown in FIGS. 1 and 2, for each second magnetic column 11, there is at least one air gap 105 between the first terminal 11a of the second magnetic column 11 and at least one cover plate 102 of the at least two inductors 10, and there is at least one air gap 105 between the second terminal 11b of the second magnetic column 11 and at least one base plate 101 of the at least two inductors 10.

Further, the non-magnetic electrical insulating layers 106 may be disposed at where the air gaps 105 exist, specifically, between the first terminal 11a of the second magnetic column 11 and the cover plates 102, and between the second terminal 11b of the second magnetic column 11 and the base plates 101. In the preferred embodiment as shown in FIGS. 1 and 2, each inductor unit 13 has four air gaps 105.

In some preferred embodiments, the base plate 101, the cover plate 102, the first magnetic column 103 and the second magnetic column 11 may include a magnetic core material, such as manganese-zinc ferrite or nickel-zinc ferrite, so as to increase magnetic induction intensity of the inductor structure 1.

In some preferred embodiments, on the plane formed by the x direction and the y direction, cross sections of the first magnetic column 103 and the second magnetic column 11 may be rectangular, circular or elliptical. When the second magnetic column 11 is a cylinder, a portion of the base plate 101 connected to the second terminal 11b of the second magnetic column 11 may have an arc matching with an arc of the second terminal 11b. Similarly, a portion of the cover plate 102 connected to the first terminal 11a of the second magnetic column 11 may have an arc matching with an arc of the first terminal 11a.

In the preferred embodiment as shown in FIGS. 1 and 2, the inductor structure 1 includes one second magnetic column 11. An extension direction (the u direction as shown) of the second magnetic column 11 may be parallel to the z direction. Specifically, the second magnetic column 11 is disposed between the first inductor 121 and the second inductor 122 along the first direction (the w direction as shown).

Along the first direction (the w direction as shown), the first inductor 121 and the second inductor 122 may be symmetrical about the second magnetic column 11 therebetween.

Further, one side of the first terminal 11a of the second magnetic column 11 along the w direction is connected to the cover plate 102 of the first inductor 121, and the other side of the first terminal 11a of the second magnetic column 11 along the w direction is connected to the cover plate 102 of the second inductor 122.

Further, one side of the second terminal 11b of the second magnetic column 11 along the w direction is connected to the base plate 101 of the first inductor 121, and the other side of the second terminal 11b of the second magnetic column 11 along the w direction is connected to the base plate 101 of the second inductor 122.

In the preferred embodiment as shown in FIGS. 1 and 2, the air gaps 105 exist between the first terminal 11a of the second magnetic column 11 and the cover plate 102 of the first inductor 121, between the first terminal 11a of the second magnetic column 11 and the cover plate 102 of the second inductor 122, between the second terminal 11b of the second magnetic column 11 and the base plate 101 of the first inductor 121, and between the second terminal 11b of the second magnetic column 11 and the base plate 101 of the second inductor 122.

For the sake of distinction, the air gap between the second magnetic column 11 and the cover plate 102 of each inductor 10 is marked as the air gap 105d, for example, the air gap 105d between the first terminal 11a of the second magnetic column 11 and the cover plate 102 of the first inductor 121, and the air gap 105d between the first terminal 11a of the second magnetic column 11 and the cover plate 102 of the second inductor 122, and the corresponding non-magnetic electrical insulating layer is marked as the non-magnetic electrical insulating layer 106d. The air gap between the second magnetic column 101 and the base plate 101 of each inductor 10 is marked as the air gap 105c, for example, the air gap 105c between the second terminal 11b of the second magnetic column 11 and the base plate 101 of the first inductor 121, and the air gap 105c between the second terminal 11b of the second magnetic column 11 and the base plate 101 of the second inductor 122, and the corresponding non-magnetic electrical insulating layer is marked as the non-magnetic electrical insulating layer 106c.

As the air gaps 105 can increase magnetic resistance, magnetic flux generated by the coil 104 wound around the first inductor 121 may go along a loop s1 as shown in FIG. 1, i.e., passing through the first magnetic column 103 and the cover plate 102 of the first inductor 121, the second magnetic column 11, and the base plate 101 of the first inductor 121 successively, and returning to the first magnetic column 103 of the first inductor 121 to form the closed magnetic flux loop s1. The magnetic flux in accordance to the magnetic flux loop s1 passes through four air gaps 105 (i.e., the air gaps 105a, 105b, 105c and 105d as shown).

If the magnetic flux generated by the coil 104 wound around the first inductor 121 passes through the first magnetic column 103 and the cover plate 102 of the first inductor 121 successively, then passes through the cover plate 102, the first magnetic column 103 and the base plate 101 of the second inductor 122, and then returns to the base plate 101 of the first inductor 121 to form a closed magnetic flux loop, the magnetic flux may pass through eight air gaps 105. Therefore, the aforementioned magnetic flux loop s1 formed by flowing through the second magnetic column 11 is better.

Similarly, magnetic flux generated by the coil 104 wound around the second inductor 122 may go along a loop s2 as shown in FIG. 1, i.e., passing through the first magnetic column 103 and the base plate 101 of the second inductor 122, the second magnetic column 11, and the cover plate 102 of the second inductor 122 successively, and returning to the first magnetic column 103 of the second inductor 122 to form the closed magnetic flux loop s2.

In some preferred embodiments, the first terminal 11a of the second magnetic column 11 is aligned with a first surface 102a of the cover plates 102 of the at least two inductors 10 (for example, the first inductor 121 and the second inductor 122), wherein the first surface 102a of the cover plates 102 is a side of the cover plates 102 away from the base plates 101.

In some preferred embodiments, the second terminal 11b of the second magnetic column 11 is aligned with a first surface 101a of the base plates 101 of the at least two inductors 10 (for example, the first inductor 121 and the second inductor 122), wherein the first surface 101a of the base plates 101 is a side of the base plates 101 away from the cover plates 102.

From above, by the preferred embodiment, multiple inductors 10 can be integrated in a small space, and the multiple inductors 10 arranged close to each other may not be affected by mutual influence of magnetism, which is conductive to reducing a size of a device to realize miniaturization. Specifically, the inductor structure 1 is formed by sandwiching a common second magnetic column 11 between the inductors 10, so that multiple inductors 10 can share the same second magnetic column 11, which is conducive to reducing the number of components to realize miniaturization. Further, with the arrangement of the air gaps 105 provided in the preferred embodiment, when the magnetic flux loop of each inductor 10 passes through the adjacent second magnetic column 11, the number of air gaps 105 the magnetic flux loop passes through is the least, so that the magnetic flux loops formed by the coils 104 wound around the first magnetic columns 103 are substantially isolated from each other.

Further, at least one air gap 105 exists between the second magnetic column 11 and each inductor 10 connected to it. Due to the increase of magnetic resistance at the air gap 105, it is possible to limit the magnetic flux in each inductor 10 by increasing the magnetic resistance. Due to the air gap 105, the magnetic flux in each inductor 10 generally passes through the common second magnetic column 11 rather than other paths (such as a serial flow to the adjacent inductor 10), which may effectively avoid mutual influence of magnetism of the multiple inductors 10. Therefore, by the preferred embodiment, multiple inductors 10 may be arranged in a small space without mutual influence.

In some preferred embodiments, for any of the inductors 10, at least one spacer bead (not shown) is disposed between the base plate 101 of the inductor 10 and the first magnetic column 103, so as to generate the air gap 105b between the base plate 101 and the first magnetic column 103.

Similarly, at least one spacer bead (not shown) is disposed between the cover plate 102 of the inductor 10 and the first magnetic column 103, so as to generate the air gap 105a between the cover plate 102 and the first magnetic column 103.

In some preferred embodiments, there may be a gap between adjacent spacer beads to further enlarge the air gaps 105.

In some preferred embodiments, a plurality of spacer beads may be arranged in an array on an upper surface of the first magnetic column 103 and in contact with the cover plate 102. Similarly, a plurality of spacer beads may be arranged in an array on a lower surface of the first magnetic column 103 and in contact with the base plate 101.

Further, the air gaps 105 may optimize heat dissipation capacity of the inductor structure 1.

Figure 3:
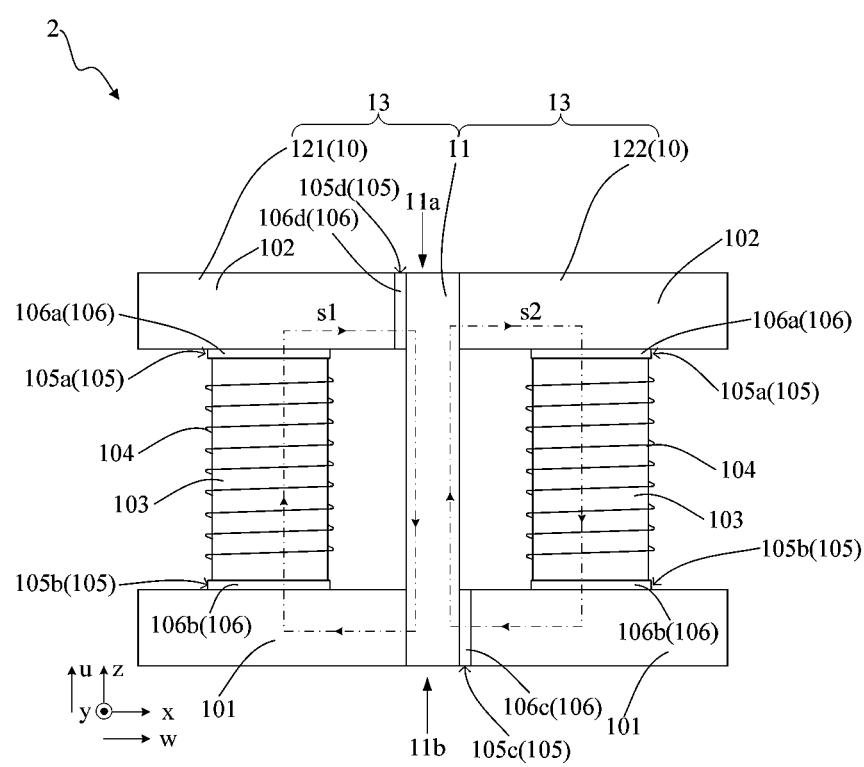
FIG. 3 schematically illustrates a diagram of an inductor structure according to a preferred embodiment of the present invention.

FIG. 3 schematically illustrates a diagram of an inductor structure 2 according to a preferred embodiment. In following descriptions, merely differences between the inductor structure 2 and the inductor structure 1 as shown in FIG. 1 are described.

Referring to FIG. 3, the inductor structure 2 may include a first inductor 121, a second inductor 122 and a second magnetic column 11.

Detailed structures of the first inductor 121, the second inductor 122 and the second magnetic column 11 may be referred to the related descriptions of the preferred embodiment as shown in FIG. 1, and are not described here.

In the preferred embodiment, differences from the preferred embodiment as shown in FIG. 1 mainly lie in that the number of air gaps between the second magnetic column 11 and two adjacent inductors 10 is two. That is, in the preferred embodiment, six air gaps 105 may exist in the inductor structure 2 including the two inductors 10, and there are three air gaps 105 in each inductor unit 13.

Further, for the two air gaps 105 between the second magnetic column 11 and the two adjacent inductors 10, one of the two air gaps 105, for example, the air gap 105d, may exist between the first terminal 11a of the second magnetic column 11 and the cover plate 102 of the first inductor 121, and the other of the two air gaps 105, for example, the air gap 105c, may exist between the second terminal 11b of the second magnetic column 11 and the base plate 101 of the second inductor 122. In other words, in addition to the air gaps 105a between the first magnetic columns 103 and the cover plates 102 and the air gaps 105b between the first magnetic columns 103 and the base plates 101, the remaining two air gaps 105 (i.e., the air gaps 105c and 105d) are arranged diagonally between the second magnetic column 11 and the adjacent two inductors 10 in a plane defined by the x direction and the z direction, as shown in FIG. 3.

The diagonally arranged air gaps 105 may ensure that the two inductors 10 share a same magnetic core without mutual magnetic interference, which is conducive to miniaturization of the device.

Alternatively, in some preferred embodiments, for the two air gaps 105 between the second magnetic column 11 and the two adjacent inductors 10, one of the two air gaps 105, for example, the air gap 105d, may exist between the first terminal 11a of the second magnetic column 11 and the cover plate 102 of the second inductor 122, and the other of the two air gaps 105, for example, the air gap 105c, may exist between the second terminal 11b of the second magnetic column 11 and the base plate 101 of the first inductor 121.

That is, the number of air gaps 105 in each inductor unit 13 in the inductor structure 2 may be the same, while positions of the air gaps 105 in different inductor units 13 may be different.

Alternatively, in some preferred embodiments, for the two air gaps 105 between the second magnetic column 11 and the two adjacent inductors 10, one of the two air gaps 105 may exist between the first terminal 11a of the second magnetic columns 11 and the cover plate 102 of the second inductor 122, and the other of the two air gaps 105 may exist between the first terminal 11a of the second magnetic column 11 and the cover plate 102 of the first inductor 121.

Alternatively, in some preferred embodiments, for the two air gaps 105 between the second magnetic column 11 and the two adjacent inductors 10, one of the two air gaps 105 may exist between the second terminal 11b of the second magnetic columns 11 and the base plate 101 of the second inductor 122, and the other of the two air gaps 105 may exist between the second terminal 11b of the second magnetic column 11 and the base plate 101 of the first inductor 121.

That is, the number and positions of the air gaps 105 included in each inductor unit 13 in the inductor structures 1 and 2 may be the same.

Alternatively, in some preferred embodiments, the number of air gaps between the second magnetic column 11 and the two adjacent inductors 10 may be three. That is, the number of air gaps included in each of the two inductor units 13 is different, and positions of the air gaps in different inductor units 13 may be the same or different.

For example, in addition to the air gaps 105a between the first magnetic columns 103 and the cover plates 102 and the air gaps 105b between the first magnetic columns 103 and the base plates 101, the air gaps 105 may also exist between the first terminal 11a of the second magnetic column 11 and the cover plate 102 of the first inductor 121, between the first terminal 11a of the second magnetic column 11 and the cover plate 102 of the second inductor 122, and between the second terminal 11b of the second magnetic column 11 and the base plate 101 of the first inductor 121. That is, there are two air gaps (the air gaps 105c and 105d) between the second magnetic column 11 and the first inductor 121, and there is one air gap (the air gap 105d) between the second magnetic column 11 and the second inductor 122).

For another example, in addition to the air gaps 105a between the first magnetic columns 103 and the cover plates 102 and the air gaps 105b between the first magnetic columns 103 and the base plates 101, the air gaps 105 may also exist between the first terminal 11a of the second magnetic column 11 and the cover plate 102 of the first inductor 121, between the first terminal 11a of the second magnetic column 11 and the cover plate 102 of the second inductor 122, and between the second terminal 11b of the second magnetic column 11 and the base plate 101 of the second inductor 122. That is, there is one air gap (the air gap 105d) between the second magnetic column 11 and the first inductor 121, and there are two air gaps (the air gaps 105c and 105d) between the second magnetic column 11 and the second inductor 122).

For another example, in addition to the air gaps 105a between the first magnetic columns 103 and the covers plates 102 and the air gaps 105b between the first magnetic columns 103 and the base plates 101, the air gaps 105 may also exist between the first terminal 11a of the second magnetic column 11 and the cover plate 102 of the first inductor 121, between the second terminal 11b of the second magnetic column 11 and the base plate 101 of the first inductor 121, and between the second terminal 11b of the second magnetic column 11 and the base plate 101 of the second inductor 122. That is, there are two air gaps (the air gaps 105c and 105d) between the second magnetic column 11 and the first inductor 121, and there is one air gap (the air gap 105c) between the second magnetic column 11 and the second inductor 122).

For another example, in addition to the air gaps 105a between the first magnetic columns 103 and the cover plates 102 and the air gaps 105b between the first magnetic columns 103 and the base plates 101, the air gaps 105 may also exist between the first terminal 11a of the second magnetic column 11 and the cover plate 102 of the second inductor 122, between the second terminal 11b of the second magnetic column 11 and the base plate 101 of the first inductor 121, and between the second terminal 11b of the second magnetic column 11 and the base plate 101 of the second inductor 122. That is, there is one air gap (the air gap 105c) between the second magnetic column 11 and the first inductor 121, and there are two air gaps (the air gaps 105c and 105d) between the second magnetic column 11 and the second inductor 122).

Figure 4:
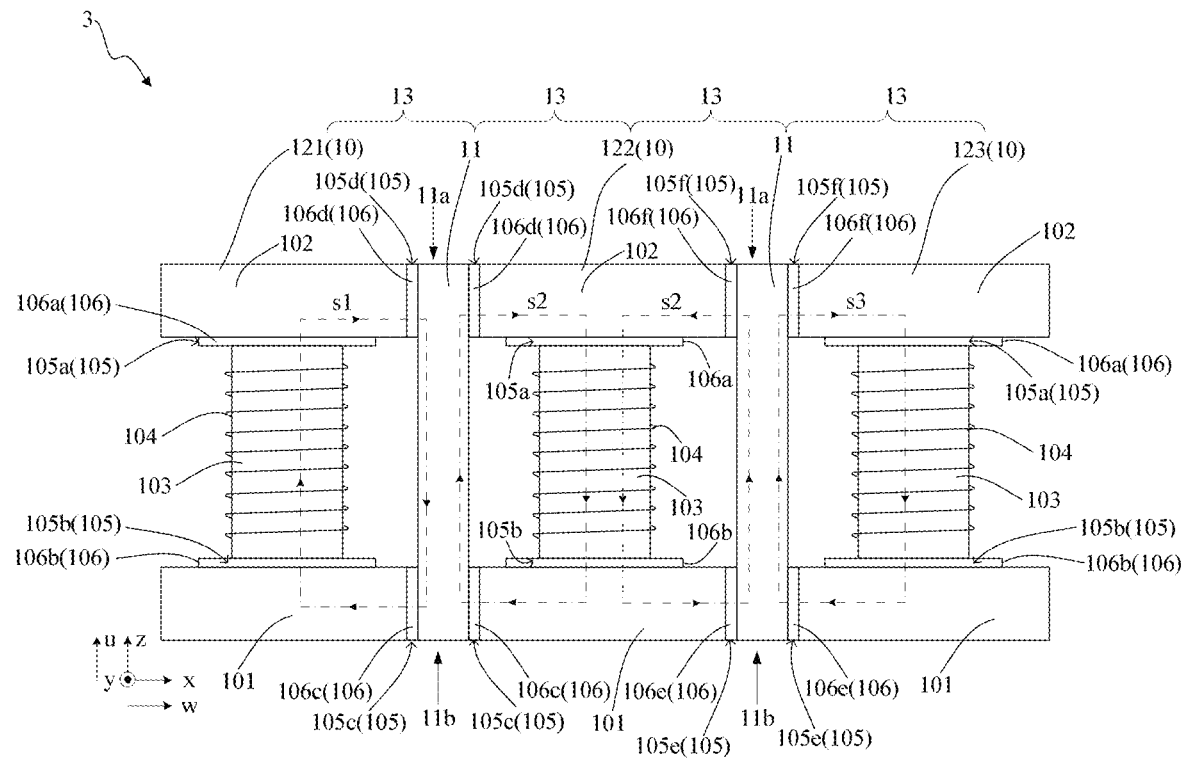
FIG. 4 schematically illustrates a diagram of an inductor structure according to a preferred embodiment of the present invention.

FIG. 4 schematically illustrates a diagram of an inductor structure 3 according to a preferred embodiment. In following descriptions, merely differences between the inductor structure 3 and the inductor structure 1 as shown in FIG. 1 are described.

Referring to FIG. 4, the inductor structure 3 includes three inductors 10 and two second magnetic columns 11 arranged at intervals along a first direction (the w direction as shown), the three inductors 10 including a first inductor 121, a second inductor 122 and a third inductor 123. In the preferred embodiment illustrated in FIG. 4, the first direction (the w direction as shown) is parallel to the x direction.

Detailed structures of the first inductor 121, the second inductor 122, and the second magnetic column 11 disposed between the first inductor 121 and the second inductor 122 and connection relations among each other may be referred to related descriptions of the preferred embodiments as shown in FIGS. 1 and 3, and are not described here.

In the preferred embodiment, differences from the preferred embodiment as shown in FIG. 1 mainly lie in that the inductor structure 3 further includes the third inductor 123 and the second magnetic column 11 disposed between the second inductor 122 and the third inductor 123. That is, the inductor structure 3 constitute four inductor units 13.

For the second magnetic column 11 disposed between the second inductor 122 and the third inductor 123, the arrangement of the air gaps 105 between the second magnetic column 11 and the second inductor 122, and between the second magnetic column 11 and the third inductor 123 may be referred to above descriptions of the preferred embodiments as shown in FIGS. 1 and 3.

For the sake of distinction, in addition to the air gaps 105a, 105b, 105c and 105d as shown in FIGS. 1 and 3, in FIG. 4, air gaps 105 between the cover plate 102 of the third inductor 123 and the second magnetic column 11, and between the cover plate 102 of the second inductor 122 and the second magnetic column 11 are marked as 105f, and the corresponding non-magnetic electrical insulating layers are marked as 106f. Air gaps 105 between the base plate 101 of the third inductor 123 and the second magnetic column 11, and between the base plate 101 of the second inductor 122 and the second magnetic column 11 are marked as 105e, and the corresponding non-magnetic electrical insulating layers are marked as 106e.

A coil 104 wound around the first magnetic column 103 of the third inductor 123 forms a closed magnetic flux loop s3 which passes through the second magnetic column 11 disposed between the third inductor 123 and the second inductor 122.

In some preferred embodiments, the number and positions of the air gaps 105 between the second magnetic column 11 and its adjacent inductors 121 and 122 may be the same with the number and positions of the air gaps 105 between the second magnetic column 11 and its adjacent inductors 122 and 123.

For example, referring to FIG. 4, for any one of the two second magnetic columns 11, the air gaps 105 (i.e., the air gaps 105d and the air gaps 105f) exist between the first terminal 11a and the two adjacent cover plates 102, the air gaps 105 (i.e., the air gaps 105c and the air gaps 105e) exist between the second terminal 11b and the two adjacent base plates 101.

In some preferred embodiments, on a plane defined by the x direction and the y direction, a size of the non-magnetic electrical insulating layer 106 is adapted to a cross section of the first magnetic column 103, as shown in FIGS. 1 to 3. Alternatively, the size of the non-magnetic electrical insulating layer 106 may be larger than a cross-sectional area of the first magnetic column 103, as shown in FIG. 4. Alternatively, the size of the non-magnetic electrical insulating layer 106 may be smaller than the cross-sectional area of the first magnetic column 103.

In some preferred embodiments, on a plane defined by the y direction and the z direction, a size of the non-magnetic electrical insulating layer 106 is adapted to a cross section of the cover plate 102 or the base plate 101. Alternatively, the size of the non-magnetic electrical insulating layer 106 may be larger than a cross-sectional area of the cover plate 102 or the base plate 101. Alternatively, the size of the non-magnetic electrical insulating layer 106 may be smaller than the cross-sectional area of the cover plate 102 or the base plate 101.

From above, the three inductors 10 arranged close to each other are integrated in the inductor structure 3, and a size of the inductor structure 3 is relatively small.

Alternatively, in some preferred embodiments, the third inductor 123 may be disposed on a side of the first inductor 121 away from the second inductor 122.

Alternatively, in some preferred embodiments, the number and positions of the air gaps 105 between the second magnetic column 11 and the adjacent inductors 121 and 122 are different from the number and positions of the air gaps 105 between the second magnetic column 11 and the adjacent inductors 122 and 123. In other words, among the plurality of inductor units 13 in the inductor structure 3, the number and/or positions of the air gaps in at least one inductor unit 13 may be different from the number and/or positions of the air gaps in other inductor units 13.

For example, the number and positions of the air gaps 105 between the second magnetic column 11 and its adjacent inductors 121 and 122 may be referred to those of the four air gaps 105 described in the preferred embodiment as shown in FIG. 1. And the number and positions of the air gaps 105 between the second magnetic column 11 and its adjacent inductors 122 and 123 may be referred to those of the two air gaps 105 described in the preferred embodiment as shown in FIG. 3. Alternatively, the number and positions of the air gaps 105 between the second magnetic column 11 and its adjacent inductors 121 and 122 may be referred to those of the two air gaps 105 described in the preferred embodiment as shown in FIG. 3. And the number and positions of the air gaps 105 between the second magnetic column 11 and its adjacent inductors 122 and 123 may be referred to those of the four air gaps 105 described in the preferred embodiment as shown in FIG. 1.

For another example, the number and positions of the air gaps 105 between the second magnetic column 11 and its adjacent inductors 121 and 122 may be referred to those of the four air gaps 105 described in the preferred embodiment as shown in FIG. 1. And the number and positions of the air gaps 105 between the second magnetic column 11 and its adjacent inductors 122 and 123 may be referred to those of the three air gaps 105 described in the foregoing preferred embodiment. Alternatively, the number and positions of the air gaps 105 between the second magnetic column 11 and its adjacent inductors 121 and 122 may be referred to those of the three air gaps 105 described in the foregoing preferred embodiment. And the number and positions of the air gaps 105 between the second magnetic column 11 and its adjacent inductors 122 and 123 may be referred to those of the four air gaps 105 described in the preferred embodiment as shown in FIG. 1.

For another example, the number and positions of the air gaps 105 between the second magnetic column 11 and its adjacent inductors 121 and 122 may be referred to those of the two air gaps 105 described in the preferred embodiment as shown in FIG. 3. And the number and positions of the air gaps 105 between the second magnetic column 11 and its adjacent inductors 122 and 123 may be referred to those of the three air gaps 105 described in the foregoing preferred embodiment. Alternatively, the number and positions of the air gaps 105 between the second magnetic column 11 and its adjacent inductors 121 and 122 may be referred to those of the three air gaps 105 described in the foregoing preferred embodiment. And the number and positions of the air gaps 105 between the second magnetic column 11 and its adjacent inductors 122 and 123 may be referred to those of the two air gaps 105 described in the preferred embodiment as shown in FIG. 3.

Alternatively, in some preferred embodiments, n≥4, and m second magnetic columns 11 and the n inductors 10 are arranged at intervals along the first direction, where m is one less than n.

Figure 5:
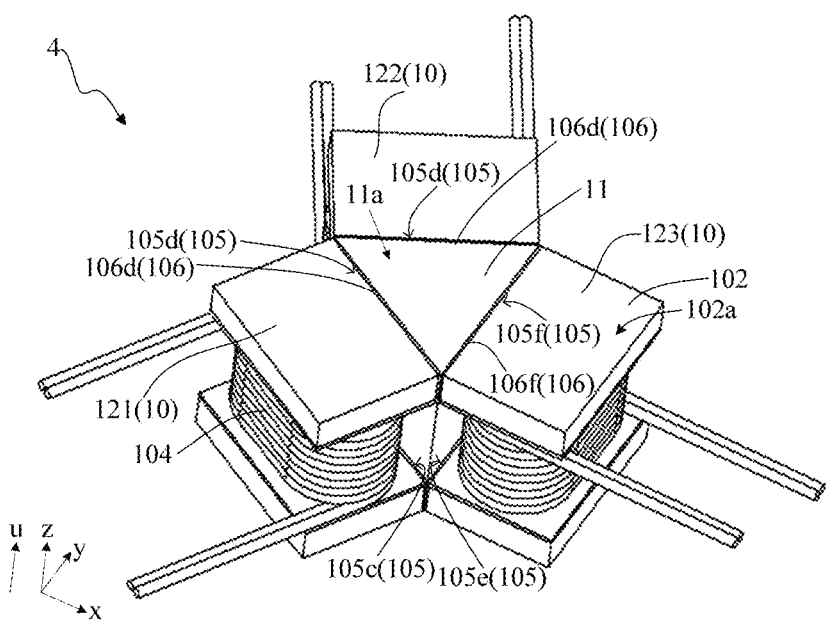
FIG. 5 schematically illustrates a diagram of an inductor structure according to a preferred embodiment of the present invention.
Figure 6:
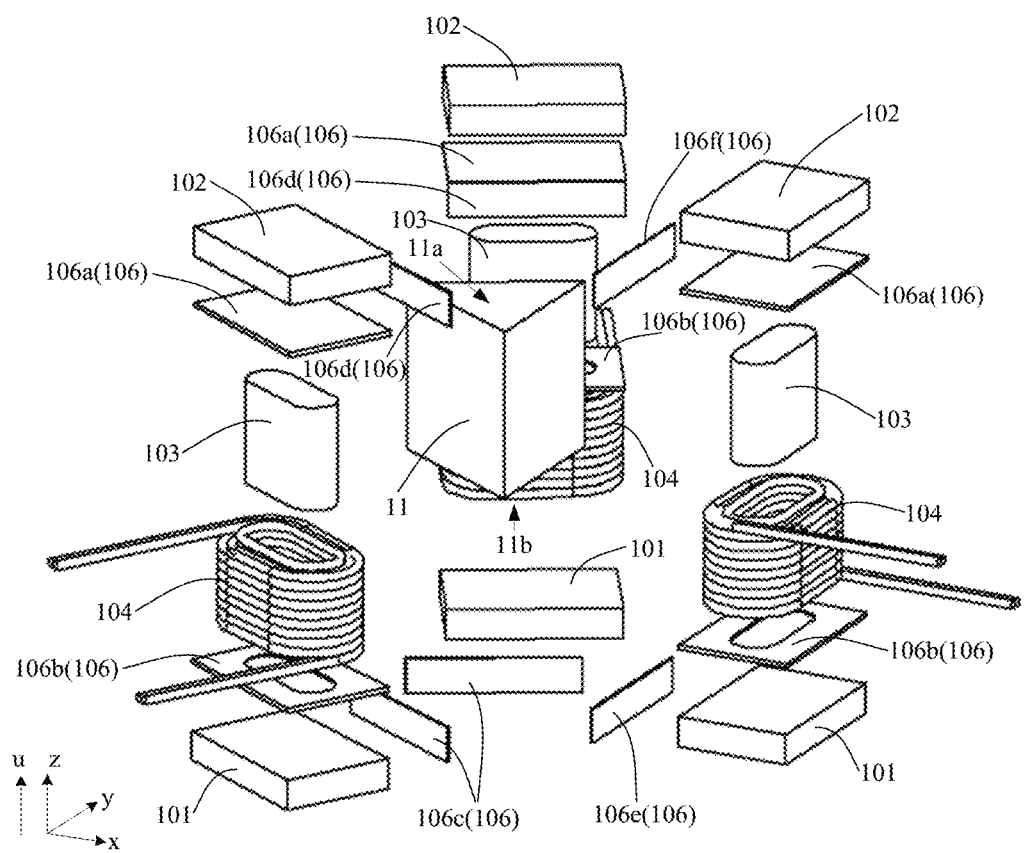
FIG. 6 schematically illustrates an explosive view of the inductor structure as shown in FIG. 5.

FIG. 5 schematically illustrates a diagram of an inductor structure 4 according to a preferred embodiment, and FIG. 6 schematically illustrates an explosive view of the inductor structure 4 as shown in FIG. 5.

Referring to FIGS. 5 and 6, the inductor structure 4 includes n inductors 10 and m second magnetic column(s) 11. On a plane defined by the x direction and the y direction, the n inductors 10 form a ring structure, and the m second magnetic column(s) 11 is/are disposed within the ring structure surrounded by the n inductors 10.

Detailed structures of the first inductor 121, the second inductor 122 and the third inductor 123 may be referred to related descriptions of the preferred embodiments as shown in FIGS. 1, 3 and 4, and are not described here.

In the preferred embodiment, differences from the preferred embodiment as shown in FIG. 1 mainly lie in that the inductor structure 4 includes three inductors 10. Differences from the preferred embodiment as shown in FIG. 4 mainly lie in that the three inductors 10 are not arranged in the same direction, but form the ring structure, and the number of the second magnetic columns 11 is also different.

In the preferred embodiment as shown in FIGS. 5, n=3 and m=1. The n inductors 10 include the first inductor 121, the second inductor 122 and the third inductor 123 that are arranged in a ring shape. The cover plates 102 of the first inductor 121, the second inductor 122 and the third inductor 123 form a ring in a plane defined by the x direction and the y direction, and the base plates 101 of the first inductor 121, the second inductor 122 and the third inductor 123 form a ring on the plane defined by the x direction and the y direction.

In the preferred embodiment, the inductor structure 4 includes one second magnetic column 11, and the second magnetic column 11 is surrounded by the first inductor 121, the second inductor 122 and the third inductor 123 that are arranged in the ring shape.

Accordingly, the first inductor 121 and the second magnetic column 11 constitute an inductor unit 13, the second inductor 122 and the second magnetic column 11 constitute an inductor unit 13, and the third inductor 123 and the second magnetic column 11 constitute an inductor unit 13. That is, the inductor structure 4 includes three inductor units 13.

In some preferred embodiments, the second magnetic column 11 may have a triangular prism shape, and each side of the second magnetic column 11 is connected to the base plate 101 and the cover plate 102 of one of the three inductors 10.

Further, the first terminal 11a of the second magnetic column 11 is connected to the cover plates 102 of the first inductor 121, the second inductor 122 and the third inductor 123.

Further, the second terminal 11b of the second magnetic column 11 is connected to the base plates 101 of the first inductor 121, the second inductor 122 and the third inductor 123.

Further, the air gaps 105 exist between the first terminal 11a of the second magnetic column 11 and the cover plate 102 of the first inductor 121, between the first terminal 11a of the second magnetic column 11 and the cover plate 102 of the second inductor 122, between the first terminal 11a of the second magnetic column 11 and the cover plate 102 of the third inductor 123, between the second terminal 11b of the second magnetic column 11 and the base plate 101 of the first inductor 121, between the second terminal 11b of the second magnetic column 11 and the base plate 101 of the second inductor 122, and between the second terminal 11b of the second magnetic column 11 and the base plate 101 of the third inductor 123.

In some preferred embodiments, on the plane defined by the x direction and the y direction, a shape of a cross section of the second magnetic column 11 may be an equilateral triangle.

Therefore, with the preferred embodiment as shown in FIG. 5, as there is no plastic spool, the inductor structure 4 may have good heat dissipation capacity and low cost. Further, for each inductor 10, a magnetic flux loop generated by the inductor 10 passes through four air gaps 105 far away from the coil 104 of the inductor 10, which may reduce edge losses.

Further, the three inductors 10 share the same second magnetic column 11, which is conducive to an overall size and cost. In addition, the magnetic fluxes generated by the coils 104 of the three inductors 10 form closed loops through the shared second magnetic column 11 respectively, without crosstalk to adjacent inductors 10, which may further reduce the overall size of the inductor structure 4 and core losses.

Alternatively, in some preferred embodiments, on the plane defined by the x direction and the y direction, the shape of the cross section of the second magnetic column 11 may be any triangle, such as a right triangle.

Alternatively, in some preferred embodiments, n≥4, and the ring shape formed by the n inductors 10 may be polygonal. Accordingly, on the plane defined by the x direction and the y direction, the shape of the cross section of the second magnetic column 11 may be a polygon, and the number of edges of the cross section of the second magnetic column 11, and length of each edge of the cross section of the second magnetic column 11 are adapted to a shape of the base plate 101 or the cover plate 102 of the corresponding inductor 10.

Alternatively, in some preferred embodiments, the second magnetic column 11 surrounded by the inductors 10 may be a single magnetic core member, or includes a plurality of spliced magnetic columns. For example, the second magnetic column 11 may be formed by splicing a plurality of magnetic cores along the z direction. For another example, the second magnetic column 11 may include a plurality of magnetic cores arranged along the x direction and/or the y direction.

Alternatively, in some preferred embodiments, for the three inductor units 13 in the inductor structure 4, the number and/or positions of the air gaps in at least one inductor unit 13 may be different from the number and/or positions of the air gaps in the other two inductor units 13.

Figure 7:
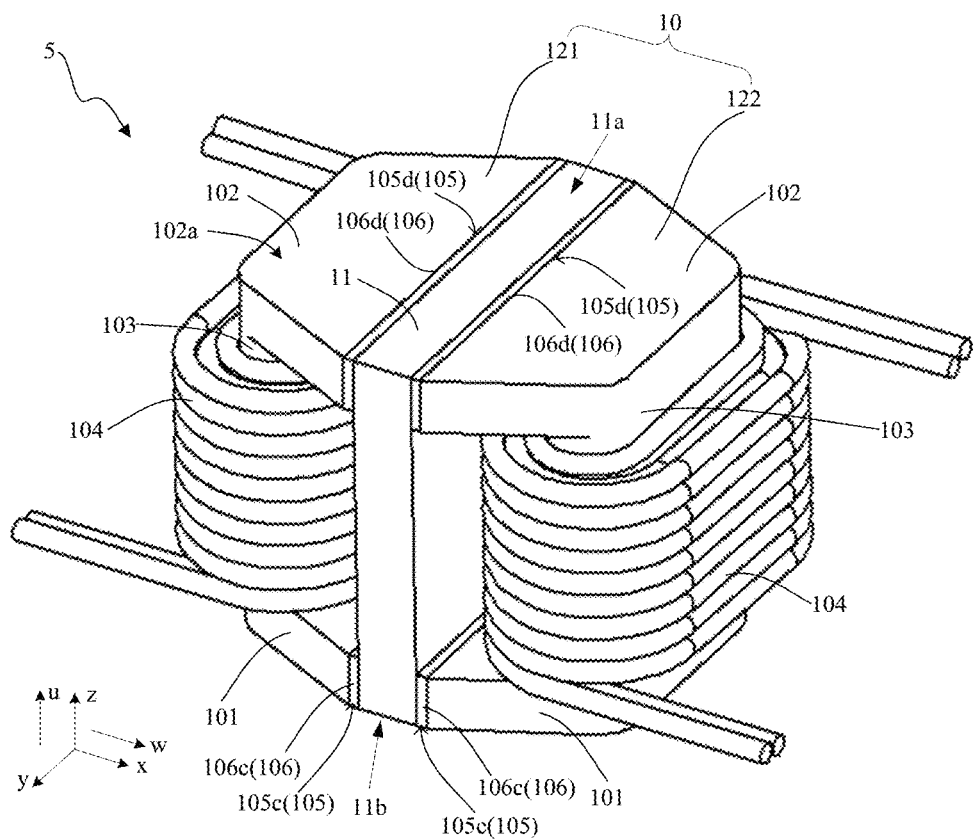
FIG. 7 schematically illustrates a diagram of an inductor structure according to a preferred embodiment of the present invention.
Figure 8:
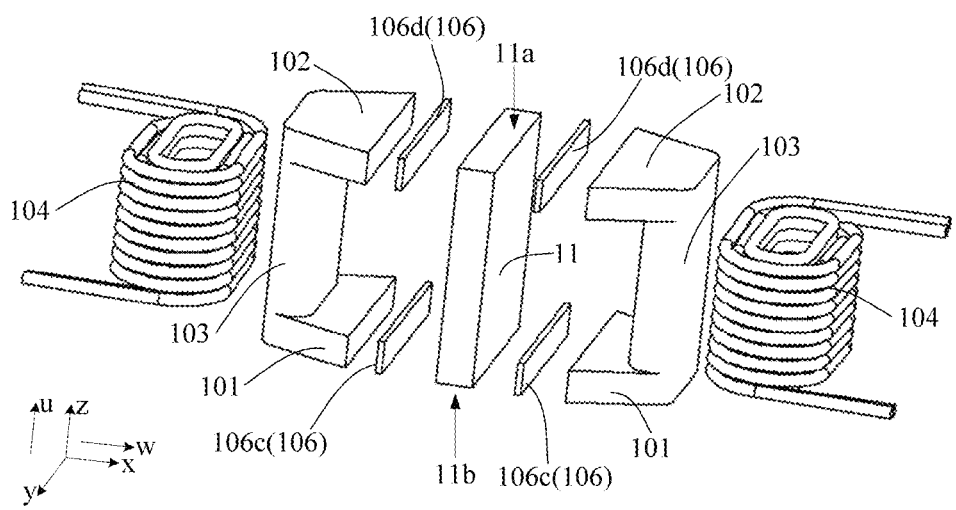
FIG. 8 schematically illustrates an explosive view of the inductor structure as shown in FIG. 7.

FIG. 7 schematically illustrates a diagram of an inductor structure 5 according to a preferred embodiment, and FIG. 8 schematically illustrates an explosive view of the inductor structure 5 as shown in FIG. 7.

Referring to FIGS. 7 and 8, the inductor structure 5 includes a first inductor 121, a second inductor 122 and a second magnetic column 11. The first inductor 121 and the second magnetic column 11 constitute an inductor unit 13, and the second inductor 122 and the second magnetic column 11 constitute an inductor unit 13.

Detailed structures of the first inductor 121, the second inductor 122 and the second magnetic column 11 may be referred to related descriptions of the preferred embodiment as shown in FIG. 1, and are not described here.

In the preferred embodiment, differences from the preferred embodiment as shown in FIG. 1 mainly lie in that the cover plate 102, the first magnetic column 103 and the base plate 101 of the first inductor 121 form a U shape facing the second inductor 122, rather than an "I" shape in the preferred embodiment as shown in FIG. 1. Similarly, the cover plate 102, the first magnetic column 103, and the base plate 101 of the second inductor 122 form a U shape facing the first inductor 121, rather than an "I" shape in the preferred embodiment as shown in FIG. 1.

Take the first inductor 121 as an example. A terminal of the cover plate 102 of the first inductor 121 away from the second inductor 122 is aligned with a side of the first magnetic column 103 away from the second inductor 122, and a terminal of the base plate 101 of the first inductor 121 away from the second inductor 122 is aligned with the side of the first magnetic column 103 away from the second inductor 122.

Further, the base plate 101, the cover plate 102 and the first magnetic column 103 of the first inductor 121 may be integrally formed. Similarly, the base plate 101, the cover plate 102 and the first magnetic column 103 of the second inductor 122 may also be integrally formed.

Further, there may be no air gap 105 (i.e., air gaps 105a and 105b) between the first magnetic column 103 and the base plate 101 of the first inductor 121, and between the first magnetic column 103 and the cover plate 102 of the first inductor 121.

Similarly, there may be no air gap 105 (i.e., air gaps 105a and 105b) between the first magnetic column 103 and the base plate 101 of the second inductor 122, and between the first magnetic column 103 and the cover plate 102 of the second inductor 122.

Referring to FIGS. 7 and 8, the inductor structure 5 may have four air gaps 105 (i.e., two air gaps 105c and two air gaps 105d), and the four air gaps 105 all exist between the second magnetic column 11 and the two inductors 10. That is, each inductor unit 13 in the inductor structure 5 includes two air gaps 105.

In some preferred embodiments, for any inductor 10 of the first inductor 121 and the second inductor 122, on the plane defined by the x direction and the y direction, cross sections of the cover plate 102 and the base plate 101 of the inductor 10 may be trapezoids, such as isosceles trapezoids.

Alternatively, the cross sections of the cover plate 102 and the base plate 101 of the inductor 10 may be rectangular as shown in FIG. 2.

Therefore, with the preferred embodiment as shown in FIG. 7, as there is no plastic spool, the inductor structure 5 may have good heat dissipation capacity and low cost. Further, for each inductor 10, a magnetic flux loop generated by the inductor 10 passes through two air gaps 105 far away from the coil 104 of the inductor 10, which may reduce edge losses.

Further, the two inductors 10 share the same second magnetic column 11, which is conducive to an overall size and cost. In addition, the magnetic fluxes generated by the coils 104 of the two inductors 10 respectively may be compensated by the shared second magnetic column 11, which may further reduce the overall size of the inductor structure 5 and core losses.

Further, the U-shaped inductor 10 may save magnetic core material, which is conducive to reducing cost and manufacturing process difficulty.

Alternatively, in some preferred embodiments, the number of air gaps 105 included in the inductor structure 5 may be 3 or even 2.

The solution of three air gaps 105 may be referred to related descriptions of alternative preferred embodiments of the preferred embodiment as shown in FIG. 3. That is, one of the two inductor units 13 in the inductor structure 5 may have two air gaps 105, and the other may have one air gap 105.

The solution of two air gaps 105 may be referred to related descriptions of the preferred embodiment as shown in FIG. 3. That is, each of the two inductor units 13 in the inductor structure 5 has one air gap 105, and positions of the two air gaps 105 in the two inductor units 13 may be the same or different.

Alternatively, in some preferred embodiments, the number of U-shaped inductors 10 in the inductor structure 5 may be 3 or more, and the U-shaped inductors 10 are arranged in a ring shape as shown in FIG. 5.

Figure 9:
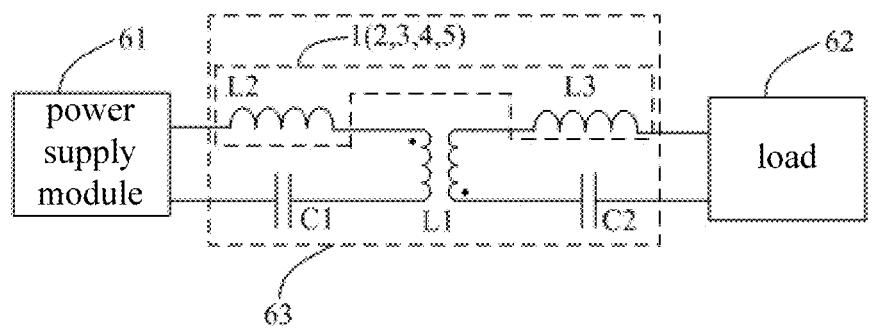
FIG. 9 schematically illustrates a principle diagram of an application scenario according to a preferred embodiment of the present invention.

In a typical application scenario, referring to FIG. 9, the inductor structures 1 to 5 described in the preferred embodiments as shown in FIGS. 1 to 8 may serve as resonant inductors of a transformer, and be applied to a CLLLC resonant circuit 63.

An input terminal of the CLLLC resonance circuit 63 may be coupled to a power supply module 61, and an output terminal of the CLLLC resonance circuit 63 may be coupled to a load 62.

The CLLLC resonant circuit 63 may include two capacitors (marked as C1 and C2 in FIG. 9) and three inductors (marked as L1, L2 and L3 in FIG. 9), where L2 and L3 are respectively disposed on a primary side and a secondary side of L1 to serve as the resonant inductors, and the three inductors (L1, L2 and L3) form the transformer.

In the application scenario, the inductors L2 and L3 may adopt any of the inductor structures 1 to 5 as shown in FIGS. 1 to 8 to be integrated as a whole, so that an overall size of the CLLLC resonant circuit 63 may be significantly reduced without magnetic field crosstalk.

Figure 10:
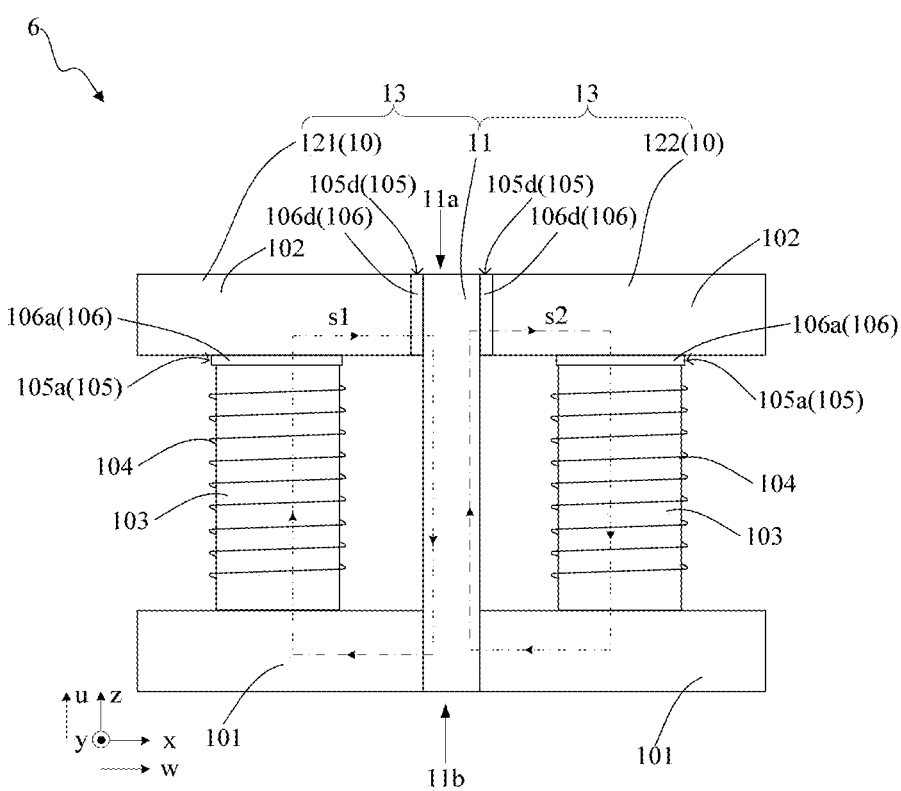
FIG. 10 schematically illustrates a diagram of an inductor structure according to a preferred embodiment of the present invention.

FIG. 10 schematically illustrates a diagram of an inductor structure 6 according to a preferred embodiment. In following descriptions, merely differences between the inductor structure 6 and the inductor structure 1 as shown in FIG. 1 are described.

Referring to FIG. 10, the inductor structure 6 includes a first inductor 121, a second inductor 122 and a second magnetic column 11.

Detailed structures of the first inductor 121, the second inductor 122 and the second magnetic column 11 may be referred to the related descriptions of the preferred embodiment as shown in FIG. 1, and are not described here.

In the preferred embodiment, differences from the preferred embodiment as shown in FIG. 1 mainly lie in that the number of air gaps 105 in each inductor unit 13 is two, and positions of the air gaps 105 in different inductor units 13 are the same.

Referring to FIG. 10, the air gaps 105 (i.e., the air gaps 105a) may exist between the cover plate 102 and the first magnetic column 103 of the first inductor 121, and between the cover plate 102 and the first magnetic column 103 of the second inductor 122. The air gaps 105 (i.e., the air gaps 105d) may also exist between the cover plate 102 of the first inductor 121 and the second magnetic column 11, and between the cover plate 102 of the second inductor 122 and the second magnetic column 11.

Therefore, miniaturization of the inductor structure 6 may also be realized based on a common magnetic core.

Alternatively, in some preferred embodiments, the air gaps 105 (i.e., the air gaps 105b) may exist between the base plate 101 and the first magnetic column 103 of the first inductor 121, and between the base plate 101 and the first magnetic column 103 of the second inductor 122. The air gaps 105 (i.e., the air gaps 105d) may also exist between the cover plate 102 of the first inductor 121 and the second magnetic column 11, and between the cover plate 102 of the second inductor 122 and the second magnetic column 11.

Alternatively, in some preferred embodiments, the air gaps 105 (i.e., the air gaps 105b) may exist between the base plate 101 and the first magnetic column 103 of the first inductor 121, and between the base plate 101 and the first magnetic column 103 of the second inductor 122. The air gaps 105 (i.e., the air gaps 105c) may also exist between the base plate 101 of the first inductor 121 and the second magnetic column 11, and between the base plate 101 of the second inductor 122 and the second magnetic column 11.

Alternatively, in some preferred embodiments, the air gaps 105 may all exist between the second magnetic column 11 and the base plates 101 and the cover plates 102 of the adjacent inductors 10.

Alternatively, in some preferred embodiments, for the two air gaps 105 in the inductor unit 13 composed of the first inductor 121 and the second magnetic column 11, a position of at least one of the two air gaps 105 is different from positions of the two air gaps 105 in the inductor unit 13 composed of the second inductor 122 and the second magnetic column 11.

Figure 11:
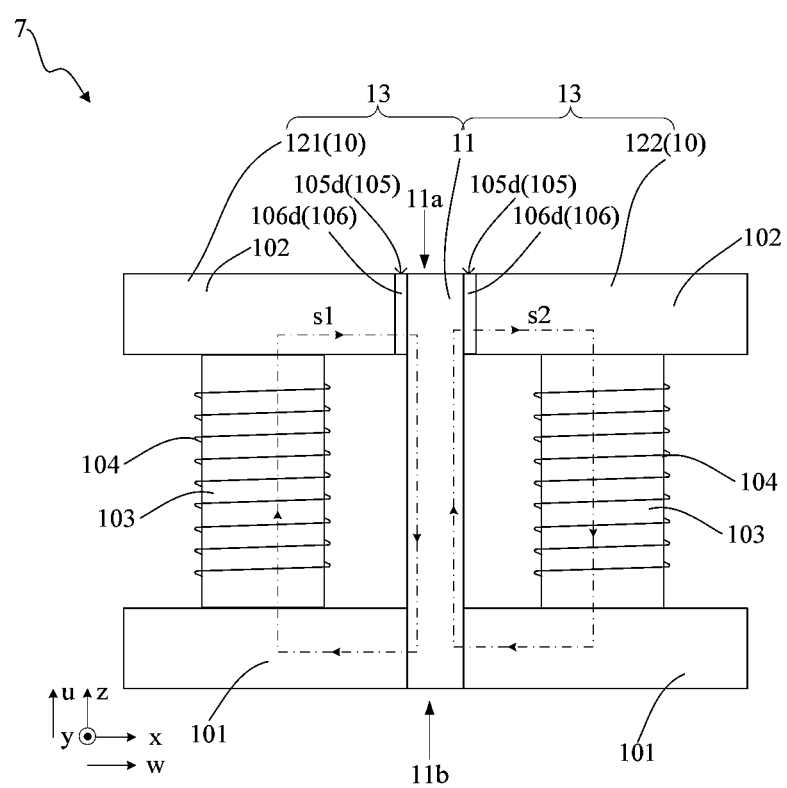
FIG. 11 schematically illustrates a diagram of an inductor structure according to a preferred embodiment of the present invention.

FIG. 11 schematically illustrates a diagram of an inductor structure 7 according to a preferred embodiment. In following descriptions, merely differences between the inductor structure 7 and the inductor structure 1 as shown in FIG. 1 are described.

Referring to FIG. 11, the inductor structure 7 includes a first inductor 121, a second inductor 122 and a second magnetic column 11.

Detailed structures of the first inductor 121, the second inductor 122 and the second magnetic column 11 may be referred to related descriptions of the preferred embodiment as shown in FIG. 1, and are not described here.

In the preferred embodiment, differences from the preferred embodiment as shown in FIG. 1 mainly lie in that each inductor unit 13 includes one air gap 105, and positions of the air gaps 105 in different inductor units 13 are the same.

Referring to FIG. 11, the air gaps 105, i.e., the air gaps 105d, may exist between the cover plate 102 of the first inductor 121 and the second magnetic column 11, and between the cover plate 102 of the second inductor 122 and the second magnetic column 11.

With the preferred embodiment, magnetic fluxes passing through the common magnetic core (that is, the second magnetic column 11) substantially cancel each other.

Figure 12:
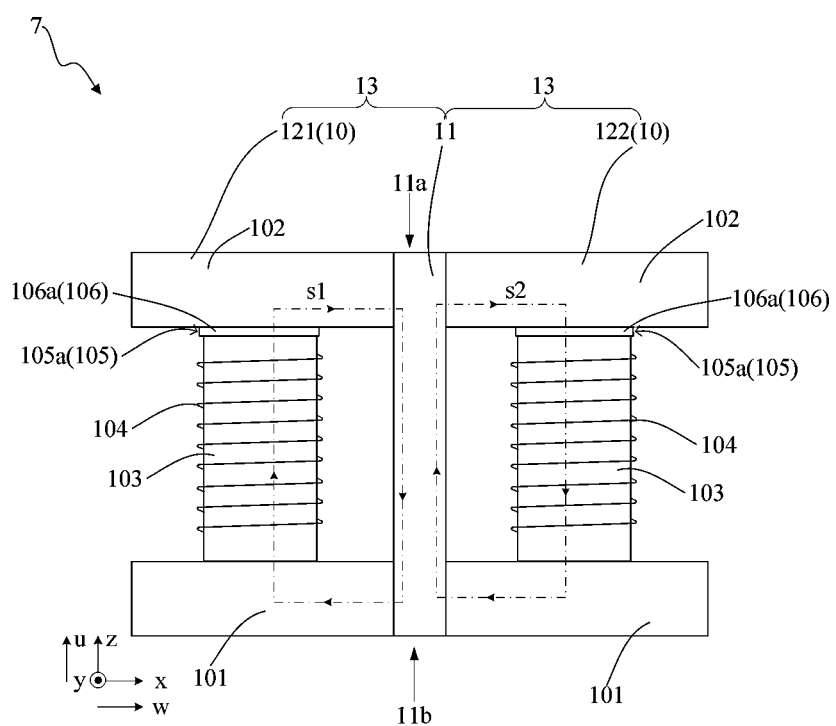
FIG. 12 schematically illustrates a diagram of an inductor structure according to a preferred embodiment of the present invention.

Alternatively, in some preferred embodiments, referring to FIG. 12, the air gaps 105, i.e., the air gaps 105a, may exist between the cover plate 102 and the first magnetic column 103 of the first inductor 121, and between the cover plate 102 and the first magnetic column 103 of the second inductor 122.

Alternatively, in some preferred embodiments, the air gaps 105, i.e., the air gaps 105b, may exist between the base plate 101 and the first magnetic column 103 of the first inductor 121, and between the base plate 101 and the first magnetic column 103 of the second inductor 122.

Alternatively, in some preferred embodiments, the air gaps 105, i.e., the air gaps 105c, may exist between the base plate 101 of the first inductor 121 and the second magnetic column 11, and between the base plate 101 of the second inductor 122 and the second magnetic column 11.

Figure 13:
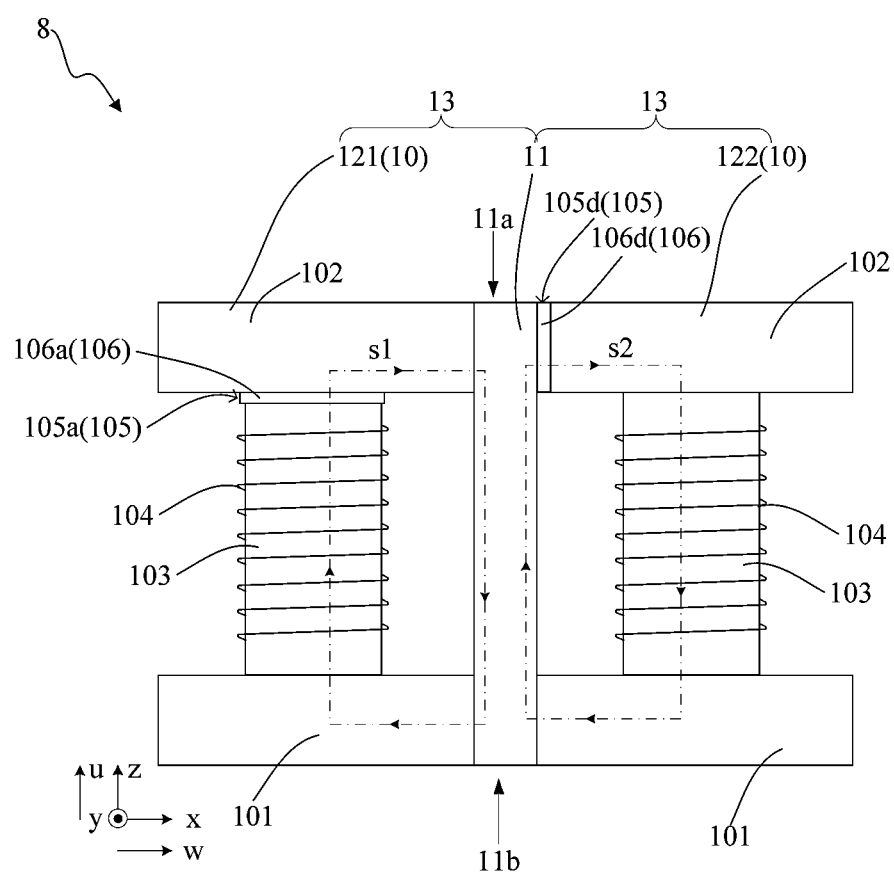
FIG. 13 schematically illustrates a diagram of an inductor structure according to a preferred embodiment of the present invention.

FIG. 13 schematically illustrates a diagram of an inductor structure 8 according to a preferred embodiment. In following descriptions, merely differences between the inductor structure 8 and the inductor structure 1 as shown in FIG. 1 are described.

Referring to FIG. 13, the inductor structure 8 includes a first inductor 121, a second inductor 122 and a second magnetic column 11.

Detailed structures of the first inductor 121, the second inductor 122 and the second magnetic column 11 may be referred to related descriptions of the preferred embodiment as shown in FIG. 1, and are not described here.

In the preferred embodiment, differences from the preferred embodiment as shown in FIG. 1 mainly lie in that each inductor unit 13 includes one air gap 105, and positions of the air gaps 105 in different inductor units 13 are different.

Referring to FIG. 13, the air gaps 105 may exist between the cover plate 102 and the first magnetic column 103 of the first inductor 121, i.e., the air gap 105a, and between the cover plate 102 of the second inductor 122 and the second magnetic column 11, i.e., the air gap 105d.

Alternatively, in some preferred embodiments, the air gaps 105 may exist between the cover plate 102 and the first magnetic column 103 of the first inductor 121, i.e., the air gap 105a, and between the base plate 101 and the first magnetic column 103 of the second inductor 122, i.e., the air gap 105b.

Alternatively, in some preferred embodiments, the air gaps 105 may exist between the cover plate 102 and the first magnetic column 103 of the first inductor 121, i.e., the air gap 105a, and between the base plate 101 of the second inductor 122 and the second magnetic column 11, i.e., the air gap 105c.

From above, multiple inductors are integrated in a small space without mutual magnetic interference, which is conducive to reduction in a size of the transformer and miniaturization of the device.

In some preferred embodiments, for each second magnetic column 11, when there are air gaps 105 between its first terminal 11a and the plurality of cover plates 102 connected with the first terminal 11a, projected cross sections of the air gaps 105 on the second magnetic column 11 may completely overlap.

Taking the preferred embodiment as shown in FIG. 1 as an example, there are air gaps 105d on both sides of the first terminal 11a of the second magnetic column 11 along the x direction, and the cross sections of the two air gaps 105d along the x direction may completely overlap.

Similarly, still referring to FIG. 1, there are air gaps 105c on both sides of the second terminal 11b of the second magnetic column 11 along the x direction, and the cross sections of the two air gaps 105c along the x direction may also completely overlap.

In some preferred embodiments, the projected cross sections of the multiple air gaps 105 on the second magnetic column 11 may partially overlap. That is, the air gaps 105 at the same terminal of the second magnetic column 11 may be slightly staggered.

Still taking the preferred embodiment as shown in FIG. 1 as an example, the cross sections of the two air gaps 105d along the x direction may completely overlap, while the cross sections of the two air gaps 105c along the x direction may partially overlap.

In some preferred embodiments, the projected cross sections of the multiple air gaps 105 on the second magnetic column 11 may not overlap. For example, along the x direction, the air gap 105a between the cover plate 102 of the first inductor 121 and the first terminal 11a of the second magnetic column 11 is completely staggered from the air gap 105 between the cover plate 102 of the second inductor 122 and the first terminal 11a of the second magnetic column 11.

In some preferred embodiments, the number of air gaps 105 in each of the plurality of inductor units 13 in the same inductor structure may be different.

In some preferred embodiments, for the same inductor structure, width of at least one air gap 105 may be different from width of other air gaps 105.

For example, the width of the air gaps 105 disposed on both sides of the first terminal 11a of the second magnetic column 11 may be different.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inductor structure, comprising:
   n inductors, wherein each of the n inductors comprises a base plate, a cover plate, a first magnetic column disposed between the base plate and the cover plate, and a coil wound around the first magnetic column, where n≥2; and
   m second magnetic column(s), wherein for each of the second magnetic column(s), the second magnetic column is disposed between at least two of the n inductors, the second magnetic column has a first terminal and a second terminal along an extension direction of the second magnetic column, the first terminal is connected to the cover plates of the at least two inductors, and the second terminal is connected to the base plates of the at least two inductors, where m<n; wherein
   each of the n inductors and the second magnetic column connected with and disposed on one side of the inductor constitute an inductor unit, and the n inductors and the m second magnetic column(s) constitute a plurality of inductor units;
   the n inductors and the m second magnetic column(s) are arranged at intervals along a first direction, and for any second magnetic column, one of the n inductors which is disposed on one side of the second magnetic column in the first direction is denoted as a first inductor, and another of the n inductors which is disposed on the other side of the second magnetic column in the first direction is denoted as a second inductor; and
   for any second magnetic column and the first and second inductors on the one side and the other side of the second magnetic column:
      air gaps are provided only between the first magnetic column and the cover plate of the first inductor, and between the second magnetic column and the cover plate of the second inductor; or
      air gaps are provided only between the first magnetic column and the cover plate of the first inductor, between the second magnetic column and the cover plate of the first inductor, between the first magnetic column and the cover plate of the second inductor, and between the second magnetic column and the cover plate of the second inductor.

2. The inductor structure according to claim 1, further comprising a non-magnetic electrical insulating layer used to form the air gaps.

3. The inductor structure according to claim 1, wherein a number and/or positions of the air gaps included in each of the plurality of inductor units is the same.

4. The inductor structure according to claim 2, wherein a number and/or positions of the air gaps included in each of the plurality of inductor units is the same.

5. The inductor structure according to claim 1, wherein the second magnetic column comprises a single magnetic column, or comprises a plurality of spliced magnetic columns.

6. The inductor structure according to claim 2, wherein the second magnetic column comprises a single magnetic column, or comprises a plurality of spliced magnetic columns.

7. The inductor structure according to claim 1, wherein for each second magnetic column, the first terminal thereof is aligned with a first surface of cover plates of the at least two inductors, and the second terminal thereof is aligned with a first surface of base plates of the at least two inductors, wherein the first surface of the base plates is a side of the base plates away from the cover plates, and the first surface of the cover plates is a side of the cover plates away from the base plates.

8. The inductor structure according to claim 2, wherein for each second magnetic column, the first terminal thereof is aligned with a first surface of cover plates of the at least two inductors, and the second terminal thereof is aligned with a first surface of base plates of the at least two inductors, wherein the first surface of the base plates is a side of the base plates away from the cover plates, and the first surface of the cover plates is a side of the cover plates away from the base plates.

* * * * *